United States Patent
Charial et al.

(10) Patent No.: US 9,051,865 B2
(45) Date of Patent: Jun. 9, 2015

(54) METHOD FOR CONTROLLING A SYSTEM FOR THE TREATMENT OF EXHAUST GASES FROM AN INTERNAL COMBUSTION ENGINE

(75) Inventors: Christophe Charial, Jouars-pontchartrain (FR); Clement Grise, Paris (FR)

(73) Assignee: Peugeot Citroen Automobilies SA. (FR)

( * ) Notice: Subject to any disclaimer, the term of this patent is extended or adjusted under 35 U.S.C. 154(b) by 238 days.

(21) Appl. No.: 13/508,683

(22) PCT Filed: Oct. 18, 2010

(86) PCT No.: PCT/FR2010/052206
§ 371 (c)(1), (2), (4) Date: May 8, 2012

(87) PCT Pub. No.: WO2011/061424
PCT Pub. Date: May 26, 2011

(65) Prior Publication Data
US 2012/0227383 A1 Sep. 13, 2012

(30) Foreign Application Priority Data
Nov. 17, 2009 (FR) ..................... 09 58103

(51) Int. Cl.
*F01N 3/00* (2006.01)
*F01N 3/20* (2006.01)
*F01N 3/023* (2006.01)
(Continued)

(52) U.S. Cl.
CPC .............. *F01N 3/208* (2013.01); *F01N 3/0231* (2013.01); *F01N 3/103* (2013.01); *F01N 3/106* (2013.01); *F01N 9/005* (2013.01); *F01N 11/00* (2013.01); *F01N 2610/02* (2013.01); *F01N 2900/0411* (2013.01); *F01N 2900/0412* (2013.01);
(Continued)

(58) Field of Classification Search
CPC ....... F01N 3/0231; F01N 3/103; F01N 3/106; F01N 3/208; F01N 11/00; F01N 13/009
USPC ........................................................... 60/274
See application file for complete search history.

(56) References Cited

U.S. PATENT DOCUMENTS

2003/0230075 A1* 12/2003 Saito et al. ...................... 60/291
2004/0040284 A1* 3/2004 Upadhyay et al. .............. 60/277
(Continued)

FOREIGN PATENT DOCUMENTS

| FR | 2902139 A1 | 12/2007 |
|---|---|---|
| JP | 2005002968 A | 1/2005 |
| WO | 2008103109 A1 | 8/2008 |

OTHER PUBLICATIONS

International Search Report from corresponding PCT/FR2010/052206 mailed Jan. 28, 2011.

Primary Examiner — Jason Shanske
(74) Attorney, Agent, or Firm — Polster Lieder

(57) ABSTRACT

The invention relates to a method for controlling a system for the treatment of exhaust gases in an exhaust line of an internal combustion engine. The method comprises estimating the molar ratio of nitrogen dioxide to nitrogen monoxide at the inlet of an NOx selective reduction catalyst based on cartography that is dependent on the residence time of the exhaust gases in an oxidation catalyst disposed upstream of the gas treatment means leading to a reduction of nitrogen oxides.

4 Claims, 4 Drawing Sheets

(51) Int. Cl.
*F01N 3/10* (2006.01)
*F01N 11/00* (2006.01)
*F01N 13/00* (2010.01)
*F01N 9/00* (2006.01)

(52) U.S. Cl.
CPC .......... *F01N2900/1621* (2013.01); *Y02T 10/47* (2013.01); *Y02T 10/24* (2013.01); *F01N 13/009* (2014.06)

(56) References Cited

U.S. PATENT DOCUMENTS

| | | | |
|---|---|---|---|
| 2004/0040289 A1* | 3/2004 | Mazur et al. | 60/295 |
| 2006/0225410 A1* | 10/2006 | Uchida et al. | 60/299 |
| 2009/0120069 A1* | 5/2009 | Nagaoka et al. | 60/286 |
| 2009/0188235 A1* | 7/2009 | Robel et al. | 60/276 |
| 2012/0006002 A1* | 1/2012 | Hagimoto et al. | 60/274 |

* cited by examiner

METHOD FOR CONTROLLING A SYSTEM FOR THE TREATMENT OF EXHAUST GASES FROM AN INTERNAL COMBUSTION ENGINE

CROSS-REFERENCE TO RELATED APPLICATIONS

This application is a National Stage of International Application No. PCT/FR2010/052206, filed Oct. 18, 2010, which claims priority to French application 0958103, filed on Nov. 17, 2009, the content of which (text, drawings and claims) is incorporated herein by reference.

FIELD

The present invention relates to a method for controlling polluting emissions from a combustion engine.

BACKGROUND

The statements in this section merely provide background information related to the present disclosure and may not constitute prior art.

The use of fossil fuel, such as petroleum or coal, in a combustion system, in particular the fuel in an engine, entails the production of a non-negligible quantity of pollutants which can be discharged through the exhaust and cause damage to the environment. Among these pollutants, nitrogen oxides (called NOx) pose a particular problem since these gases are suspected of being one of the factors contributing to the formation of acid rain and deforestation. Furthermore, NOx are linked to human health problems and are a key element in the formation of "smog" (pollution clouds) in cities. Legislation is imposing ever more strict levels for their reduction and/or their elimination from fixed or mobile sources.

Among the pollutants that the legislation tends to regulate more strictly are soot or other particulate materials resulting from incomplete combustion of fuel, more particularly when the engine is operated in poor mixture, in other words with excess oxygen (air) relative to the stoichiometry of the combustion reaction. Poor mixtures are used in so-called diesel engines, ignited by compression.

Various different depollution means and strategies are employed to control these two categories of pollutants.

To limit the emission of particles, the technology of particle filters is little by little becoming common practice for all vehicles equipped with a diesel engine. This technology consists mainly in forcing the exhaust gas to pass through the porous channels of a ceramic honeycomb structure. The soot filtered in this way is accumulated and then eliminated in a regeneration operation of the filter during which it is burned. To obtain this regeneration, it is however necessary to increase the temperature of the exhaust gas, which is typically obtained by enriching the exhaust gas with fuel (injected directly in the exhaust line or in the combustion chamber of the engine, during the discharge phase of the combustion cycle) and/or by increasing the charge of the engine. A catalytic agent is used to facilitate the combustion of soot. This agent is either permanently deposited in the filter channels, or introduced as an additive with the fuel. This last technology allows for operating at lower temperatures than those required with catalytic filters.

To limit NOx emissions, the main solution implemented in current vehicles is the reduction of emissions at the source, in other words, operating the engine in such conditions that the rate of NOx produced is less than the limit rate. These conditions are obtained by controlling, in a very precise manner, the different parameters of the engine, starting from the parameters of fuel injection and reinjection at admission of part of the exhaust gas, in order to reduce the oxygen concentration favoring the formation of nitrogen oxides.

However, it is not possible to drastically reduce the emissions at the source without limiting certain engine performances. For this reason, different solutions have been proposed for denitrifying exhaust gas. One solution which has provided proof of its effectiveness, specifically for heavy trucks, is the chemical conversion by reduction of nitrogen oxides by means of a reducing agent injected directly in the exhaust line. A post-treatment solution which has provided proof of its effectiveness is the use of ammonia ($NH_3$), such as aqueous urea. Ammonia reacts with NOx as a catalyst to form inert nitrogen $N_2$ and water $H_2O$. This solution is mainly known under its English acronym SCR or "Selective Catalytic Reduction".

A commonly used reducer is ammonia, stored in the form of urea, whereby the ammonia is obtained by thermolysis/hydrolysis of urea in the exhaust line according to the following reactions:

$$(NH_2)_2CO \rightarrow HNCO + NH_3: \text{thermolysis at } 120°\text{ C.} \quad (1)$$

$$HNCO + H_2O \rightarrow CO_2 + NH_3: \text{hydrolysis at } 180°\text{ C.} \quad (2)$$

The SCR catalyst serves to facilitate the reduction of NOx by $NH_3$ according to the 3 following reactions:

$$4NH_3 + 4NO + O_2 \rightarrow 4N_2 + 6H_2O \quad (3)$$

$$2NH_3 + NO + NO_2 \rightarrow 2N_2 + 3H_2O \quad (4)$$

$$8NH_3 + 6NO_2 \rightarrow 7N_2 + 12H_2O \quad (5)$$

Since ammonia is considered a toxic gas, it is important that the quantity of injected urea is at all times based on the quantity of nitrogen oxides to be treated.

A simple closed loop control based on the information provided by a NOx sensor installed downstream of the NOx trap is excluded for an engine operating predominantly at transitory speeds, such as the engine of an automotive vehicle.

However, the NOx quantity can be estimated on the basis of mapping nitrogen oxide emissions as a function of the engine operating conditions, in other words, essentially as a function of speed and torque requirements.

In practice however, the precise adjustment of the quantity of urea to be injected poses numerous difficulties. Indeed, the ammonia available for the reaction is the ammonia "stored" at any given time in the catalyst. The higher the temperature of the exhaust gas, the lower the ammonia storing capacity of the catalyst, since a desorption reaction is competing with an adsorption reaction. On the other hand, this temperature increase tends to promote the kinetics of the reaction, and therefore favors reducing reactions. In these conditions, emissions are difficult to control precisely.

It is therefore desirable to detect in real time abnormal operation of the SCR system, without necessarily considering an instantaneous drift of emissions as a sign of such dysfunction.

One of the difficulties in estimating the proper operation of the SCR system is that the exact nature of the gas to be treated is not very well known. Indeed, the NOx consists in part of nitrogen monoxide and in part of nitrogen dioxide, to mention only the two principal substances. The treatment capacity depends on the ratio of these two substances.

This ratio is very difficult to measure even on an engine test bench, since most of the analysis means proceed in the first stage with total oxidation of nitrogen oxides. It is evident then that it is even more difficult to evaluate this ratio in real time in a vehicle, since even the aging, for instance, of certain engine elements can lead to a drift of this ratio.

SUMMARY

Therefore, according to the invention a method is proposed for controlling a system for treatment of exhaust gas present in the exhaust line of an internal combustion engine. The method includes estimating the molar ratio between nitrogen dioxide and nitrogen monoxide at the inlet of a selective NOx reduction catalyst, starting from mapping depending on the sojourn time (i.e., the residence time) of the exhaust gas in an oxidation catalyst installed upstream of the exhaust gas treatment system entailing a reduction of nitrogen oxides.

In a variant, reduction of nitrogen oxides are accomplished via a reducer injection means and a selective reduction catalyst, downstream of these injection means.

In a variant, the value estimated starting from the mapping as a function of the sojourn time of the exhaust gas in the diesel oxidation catalyst (DOC) is corrected by a factor depending on the aging state of the DOC catalyst.

In a variant, the aging factor is defined as the ratio between the accumulated exposure time beyond a first critical temperature causing a degradation of the diesel oxidation catalyst and a reference exposure time to the first critical temperature, for which the degradation of the DOC catalyst is complete.

In a variant, when the DOC catalyst is exposed to a second critical temperature, higher than the first critical temperature, the exposure times are multiplied by a correction factor greater than 1.

In a variant, the sojourn time of the exhaust gas in the diesel oxidation catalyst DOC is estimated starting from the temperature and the pressure of the exhaust gas at the outlet of the diesel oxidation catalyst and the flow of the exhaust gas upstream of the diesel oxidation catalyst.

In a variant, gas treatment means bringing about the reduction of nitrogen oxides are constituted of a particle filter capable of operating in a mode called continuous conversion mode.

Further areas of applicability of the present teachings will become apparent from the description provided herein. It should be understood that the description and specific examples are intended for purposes of illustration only and are not intended to limit the scope of the present teachings.

DRAWINGS

Other details and advantageous characteristics of the invention will become clear from the following detailed description with reference to the attached figures showing:

DETAILED DESCRIPTION

It should be noted that NOx nitrogen oxides, as used herein, refers to the two nitrogen compositions by which the emissions are regulated, namely nitrogen monoxide and nitrogen dioxide, produced in particular by engines operating with poor mixtures. In other words, engines with excess oxygen relative to the stoichiometry of the combustion reaction of the fuel, for example, diesel engines with ignition by compression.

For clarity purposes, in the following description the hypothesis is systematically made that the reducing agent is injected as is in the exhaust line, upstream of the SCR catalyst. This is for instance the case if this agent of hydrogen or ammonia is stored in gaseous form or produced in a suitable generator before being introduced in controlled manner in the exhaust line. However, this reducing agent can also be introduced in the form of a precursor, such as the well known example of urea, which after a thermolysis and hydrolysis reaction, is transformed into ammonia (see the equations 1 and 2 shown above).

In addition, it is assumed that this reducing agent is effectively ammonia, and for clarity purposes, the designation ($NH_3$) is used systematically in the following description, even though the invention is not limited to this embodiment.

Figure 1:
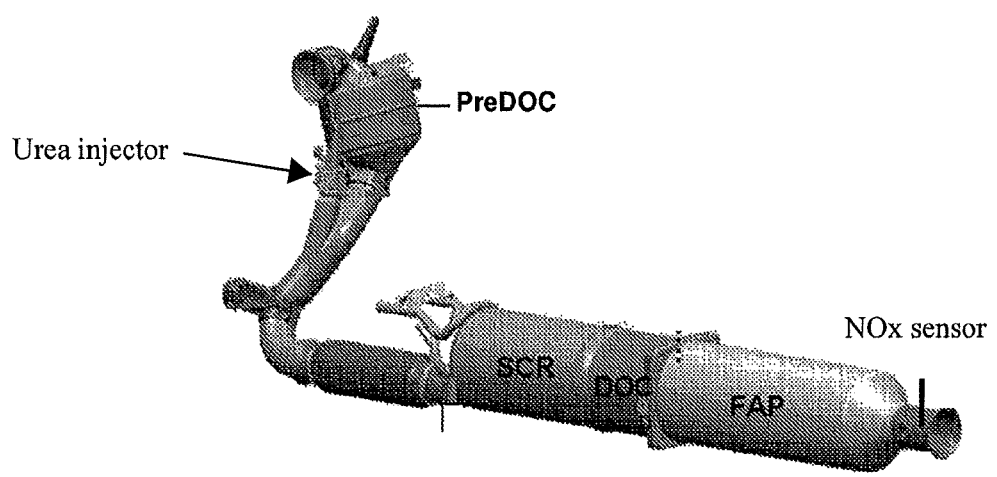
FIG. 1 is a schematic diagram of an engine exhaust gas treatment line.

FIG. 1 is a schematic of an engine exhaust gas treatment line. A diesel oxidation catalyst preDOC is installed at the beginning of the line. The primary role of the preDOC is to convert in the combustion chambers of the engine the carbon monoxide, and the fraction of unburned or partially burned gaseous hydrocarbons, in carbon dioxide. Such disposition, close to the engine, therefore in the hottest area of the exhaust line, guarantees maximum efficiency of this catalyst, but is not part of the specific scope of the invention.

Continuing in the direction of the exhaust gas flow, a temperature sensor AT3 allows for estimating the exhaust gas temperature upstream of the selective catalytic reduction SCR treatment system.

This SCR treatment system generally includes an injector, connected to a not shown source of reducing agent, and downstream of the injector, a selective reduction catalyst, called SCR catalyst. In well known manner, such SCR catalyst can be constituted of a zeolite deposited on a ceramic support, for instance of cordierite type. This type of zeolite based catalyst hardly promotes the conversion reaction of NO in $NO_2$. On the other hand, other catalysts containing platinum or palladium can provide this conversion.

If the reducing agent is not injected directly in its final form, but under the form of a precursor, for instance an aqueous solution of urea, the SCR system can also comprise a means suitable to facilitate the mixture of precursor in the exhaust gas while allowing for a relatively compact line architecture.

A particle trap FAP is also present in this line, installed in the present case downstream of the selective reduction catalyst, but it can also be installed upstream of the reducing agent injector.

Finally, a NOx sensor is provided in order to ensure that the emissions of the vehicle are always less than the prevailing emission norm.

In the rest of this document we will note with the suffix 0 data at a point upstream of the oxidation catalyst preDOC (but downstream of the branching point exhaust gas recirculation EGR of the gas), and with suffix 1, at a point downstream of the catalyst preDOC and upstream of the SCR catalyst.

The catalytic reduction of NOx by ammonia in a SCR catalyst consists essentially in a series of reactions numbered (3) to (5) mentioned above, whereby the NOx reacts with ammonia stored in the catalyst at a given time.

The efficiency of the system can be calculated at any time as, the ratio between, on the one hand, the difference between the NOx quantity emitted by the engine and the NOx quantity emitted at the end of the line, and on the other hand, the NOx quantity emitted by the engine.

The NOx quantity emitted at the end of the line is estimated by means of the NOx sensor mounted downstream of the treatment devices.

The NOx quantity emitted by the engine can be obtained starting from a map established on the basis of actual emission measurements at the outlet of the engine, typically on an engine test bench associated with a booth for chemical and quantifying analysis of the exhaust gas.

During the regulation phase of the engine, a set of parameters can be defined for each operating point of the engine optimizing the performance and the emissions of the vehicle (which can be defined as a request for engine torque at a given engine speed). Among these parameters are, for instance, the quantity of injected fuel, the quantity of fresh air admitted in the engine, the fuel injection conditions, the valve opening timing, the exhaust gas recirculation rate (EGR), etc. These parameters are transmitted to the engine processor by means of a set of maps which take into consideration parameters such as exterior temperature, the altitude (to take into account the rarefaction of oxygen), the preheating state of the engine, etc. Since the regulated emissions of the vehicle are taken into account when defining the engine parameters, an instantaneous NOx mass flow will be obtained for this engine, for each engine operating point and for given exterior conditions. If necessary, maps can be provided for degraded operating conditions, for instance, in the event of absence of gas recirculation due to malfunction of the EGR valve.

The SCR system operates nominally if the observed efficiency conforms to a theoretical model of this system which defines the maximum conversion potential in the given conditions.

To create this model, it should be noted that the catalytic reduction capacity of NOx of the SCR catalyst is a function of its temperature and the nature of the gas to be treated, in other words, of the $NO_2/NO$ ratio noted in the following as $R_{NO2/NO}$.

As long as the minimum activation temperature is not reached (called Light-off temperature), the SCR catalyst is essentially inert. Beyond that, its efficiency increases until a zone of optimum operation is reached. This efficiency is not universal but depends on the nature of the chemical substances to be treated, therefore in the specific case of exhaust gas treatment, on the ratio $R_{NO2/NO}$.

A—Determination of the $NO_2/NO$ Ratio at the Inlet of the SCR Catalyst

In an embodiment of the invention, the ratio $R_{NO2/NO}$ can be estimated based on maps established during the regulation of the engine, by analyzing the gas produced in the different operating points of the engine.

In practice, this analysis is relatively complicated, and most often, it is simply based on determining the different substances, since the NOx fraction, which is a sum of $NO_2$ and NO is considered as one part (as is the case with the existing regulatory standards, and the gas analysis is performed in simpler manner after complete oxidation of the gas, therefore total conversion of the NO fraction in $NO_2$). For this reason, one of the goals of the present invention is to propose a means for estimating the ratio $R_{NO2/NO}$ in a simpler manner.

Between the outlet of the engine and the selective reduction catalyst SCR, oxidation of a portion of the NO is taking place in the oxidation catalyst preDOC. For this reason, one of the goals of the present invention is to propose a model for estimating the ratio $R_{NO2/NO}$, whereby this model is remarkable in that the ratio is estimated as a function of the sojourn time (i.e., the residence time) of the gas in the oxidation catalyst preDOC, and weighted according to an aging factor of the oxidation catalyst preDOC.

Figure 2:
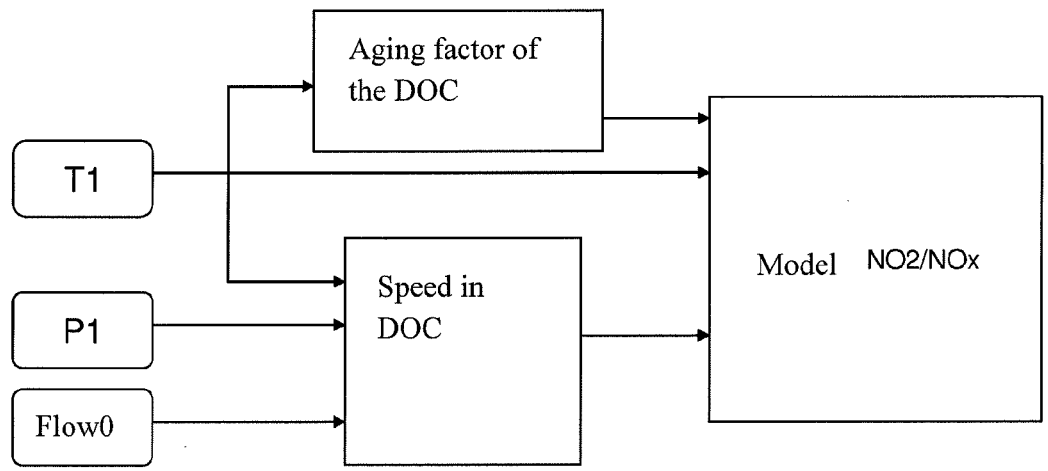
FIG. 2 is a block diagram illustrating the dependency between the estimating model for the $NO_2/NO$ ratio at the outlet of the diesel oxidation catalyst.

This model corresponds in essence to the diagram shown in FIG. 2, where only 3 input data are shown: the estimated temperature T1 and pressure P1 at the outlet of the preDOC catalyst and the exhaust gas flow Flow0 upstream of this preDOC catalyst are necessary to estimate the ratio $R_{NO2/NO}$ by means of 3 specific modules which allow for more precise calculation of the aging factor of the oxidation catalyst preDOC, the speed of the exhaust gas in the preDOC catalyst and an estimation module for the $R_{NO2/NO}$ ratio from the result of these two preceding modules.

Aging Factor Module for the Oxidation Catalyst

According to the invention, the aging factor can be estimated starting from a timer which sums the total elapsed time above a critical temperature beyond which the performance of the catalyst preDOC is irrevocably degraded. Advantageously, when the temperature to which the catalyst preDOC is exposed is particularly high (higher than a second threshold temperature, higher than the critical temperature), the time spent beyond this second threshold temperature is multiplied, for instance, by 1.5.

A normalized time factor can then be defined as the ratio between this timer and a reference timer, corresponding to the accumulated exposure time beyond the critical temperature resulting in complete degradation of the preDOC catalyst. If this timer reaches or surpasses this reference time, the aging factor will be set equal to 1. On the other hand, a new preDOC catalyst, never exposed to a temperature beyond the reference temperature will have an aging factor equal to 0.

Sojourn Time of the Gas in the Oxidation Catalyst

Figure 3:
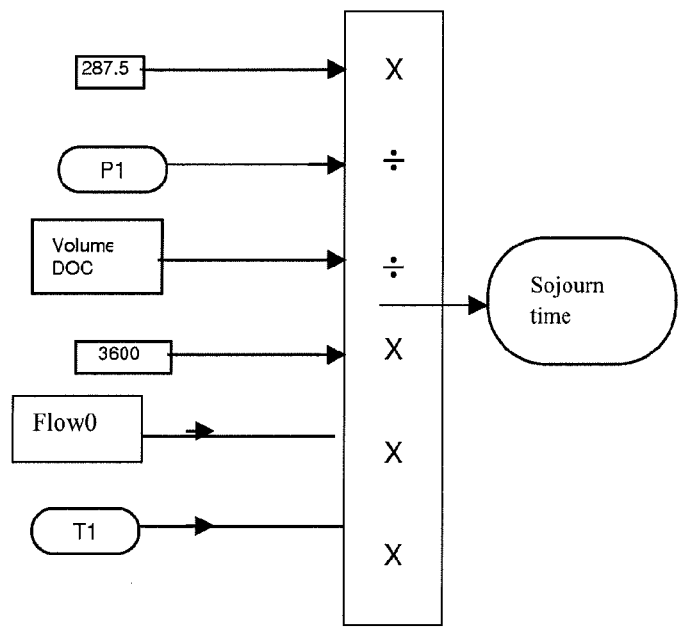
FIG. 3 is a block diagram illustrating the calculation of the sojourn time of the exhaust gas in the diesel oxidation catalyst.

A sojourn time module is illustrated in FIG. 3 and is essentially based on the law of ideal gas, with three input data, the exhaust gas temperature T1 (expressed in ° Kelvin) from a temperature sensor downstream of the oxidation catalyst, the exhaust gas pressure P1 (expressed in Pascals) from a pressure sensor downstream of the oxidation catalyst and the flow of the exhaust gas (expressed in g/s) from a flow sensor upstream of the oxidation catalyst, in other words the gas flow produced by the engine, less the flow of gas admitted in the EGR circuit if the engine is equipped with such circuit and if the branching point of the EGR circuit is located upstream of the oxidation catalyst preDOC, in other words if the engine is equipped with a high pressure EGR circuit.

The calculation additionally requires knowledge of the volume V of the preDOC catalyst (volume accessible to the gas, expressed in liters). In an ideal gas, the relation between the number n of moles of gas in the volume V at pressure P1 and temperature T1 is equal to RT/PV, R being the ideal gas constant. In the case of exhaust gas, the molar mass can be approximated, considering that the latter is essentially constituted of products of the combustion of fuel with oxygen in the air (which can be modeled by the reaction $C_7H_{16} + 11O_2 \rightarrow 7CO_2 + 8H_2O$) and that the nitrogen in the air is found in the exhaust gas. From this, the gas mass in the preDOC catalyst is deduced.

Dividing the gas mass sojourning in the preDOC catalyst by the upstream mass flow, an estimate is obtained of the sojourn time in the preDOC catalyst. Hypothetically, the sojourn time of the gas in the preDOC catalyst will be identical for all gaseous substances present in the exhaust gas, e.g., the NOx.

Estimation of the Ratio $R_{NO2/NO}$ at the Outlet of the Oxidation Catalyst

During the gas sojourn in the oxidation catalyst preDOC, part of the NOx oxidizes into $NO_2$. The reduction reactions that take place in the catalytic reduction catalyst SCR occur with a gas enriched in $NO_2$. It is therefore necessary to estimate the $NO_2/NO$ ratio ($R_{NO2/NO}$) at the outlet of the oxidation catalyst preDOC.

The ratio $R_{NO2/NO}$ depends on the nature and the dimensions of the oxidation catalyst preDOC, the aging status of the oxidation catalyst preDOC and the sojourn time of the gas in the oxidation catalyst preDOC. It has been shown above how to estimate the aging factor and the sojourn time.

The authors of the present invention have found that this ratio $NO_2/NO$ at the outlet of the oxidation catalyst preDOC can be considered as independent of the $NO_2/NO$ ratio at the inlet of the catalyst preDOC, and depends on the oxidation capacity of the oxidation catalyst preDOC and/or the sojourn time of the gas in the catalyst preDOC. For a given architecture choice, and a given aging state, the only parameter variable as a function of the operating conditions of the engine and affecting this oxidation capacity is the temperature in the catalyst preDOC.

Figure 4:
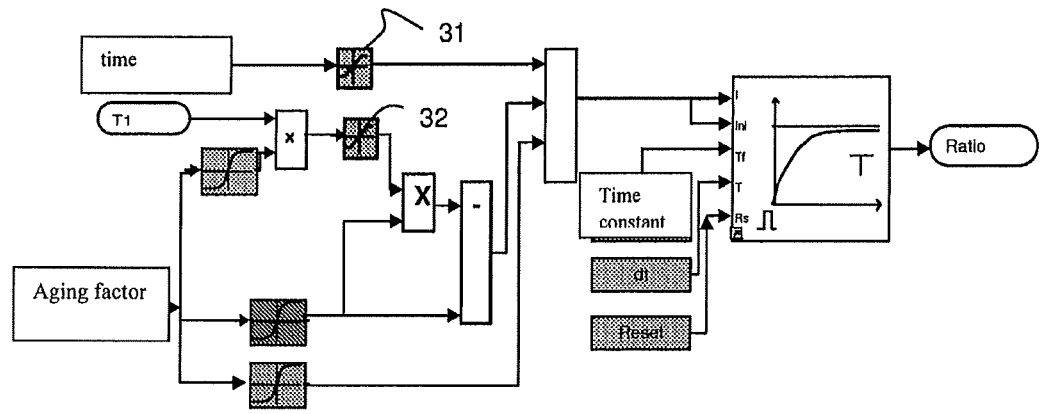
FIG. 4 is a block diagram of the estimating module for the $NO_2/NO$ ratio at the outlet of the diesel oxidation catalyst.

FIG. 4 illustrates the estimating module of the $NO_2/NO$ ratio at the outlet of the oxidation catalyst preDOC.

A first map 31 is used to select a value for the $NO_2/NO$ ratio according to the sojourn time of the gas in the preDOC catalyst. This value is corrected by a first correction factor, supplied by a second map 32 as a function of the temperature downstream of the preDOC catalyst, this first factor is for instance selected between 0 and 1.

The aging of the preDOC catalyst affects at least two levels of its performance: on the one hand its priming temperature increases, and on the other hand, beyond this priming temperature, the oxidation capacity is degraded. Therefore, two specific maps can be used to test whether the preDOC catalyst operates in a suitable temperature range, and to assign a second correction factor, again selected between 0 and 1, to take into account this degradation of the oxidation capacity. Advantageously, this second correction factor can be different at low and high temperatures, to take into account that for the low temperatures (just below the priming temperature) the degradation is stronger than for the higher temperatures, so that a lower temperature exacerbates the aging of the catalyst preDOC.

Finally the ratio is filtered by a first order low-pass filter to smooth the strong dynamics of the sojourn time, caused by variations of the flow in the exhaust line.

Once the $NO_2/NO$ ratio is estimated, it is possible to begin modeling the reduction in the SCR catalyst, since it is assumed that this ratio is not varying between the outlet of the oxidation catalyst preDOC and the inlet of the reduction catalyst SCR.

B—Determination of the Mass of $NH_3$ Stored in the SCR Catalyst

One mole of ammonia injected upstream of the SCR catalyst can eventually be "trapped" by the SCR catalyst, transformed by reacting with the NOx or go through the SCR catalyst without being transformed and end up downstream of the NH SCR catalyst.

The reduction catalyst SCR has very strong affinity for ammonia $NH_3$ and beyond a certain minimum threshold of $NH_3$ charge, the NOx reduction reaction by ammonia is not significantly catalyzed. Beyond a certain maximum threshold of $NH_3$ charge, the storage capacity is exceeded and some ammonia is released by the SCR catalyst. The ammonia released by the SCR catalyst must be added to the ammonia coming from the injection of reducer to avoid excess ammonia at the end of the exhaust line, adding to the emitted pollutants.

These minimum and maximum thresholds depend on the temperature of the SCR catalyst and are lower with increasing temperature.

Each temperature of the SCR catalyst corresponds to an optimum storage instruction, between the minimum and the maximum thresholds, which can be estimated as equal to the median between the minimum and maximum thresholds, if it is desired to minimize the total number of maps accessed. At any time, the quantity of injected reducer can be adjusted in such manner to stabilize the quantity of ammonia stored at this optimal instruction level.

It should be noted that the ammonia stored in the SCR catalyst is not volatilized following a vehicle stop, so that the modeled mass can easily be memorized at the end of each driving phase to be used as initial mass for the following driving phase. To this end, a non-volatile memory can be used, for instance a programmable and electrically erasable read-only memory of EEPROM type (acronym for "Electrically Erasable Programmable Read-Only Memory").

The $NH_3$ mass in the SCR catalyst depends on the quantity of injected ammonia, and on the NOx quantity treated by the SCR catalyst, in other words, the difference between the NOx flows upstream and downstream of the SCR catalyst. In other words, the $NH_3$ mass in the SCR catalyst is obtained by integrating the storage speed or depletion speed (by reaction of the NOx), while posing as condition to the limits that this mass is minimum equal to 0 g. This storage speed mainly depends on the quantity of ammonia injected in the line. Assuming that the ammonia is injected in the form of an aqueous solution of 32.5% urea (in mass). It can be easily calculated that for each gram of $NH_3$ solution, the SCR catalyst is loaded with 0.184 g of catalyst, e.g., zeolite deposited on a ceramic support.

The $NH_3$ mass in the SCR catalyst is decremented by the NOx mass reacting in it. This reacting NOx mass is a function of the stoichiometric ratio. To obtain the $NH_3$ mass, it is sufficient to integrate the storage or depletion speed of $NH_3$ (the minimum mass is 0 g).

Figure 7:
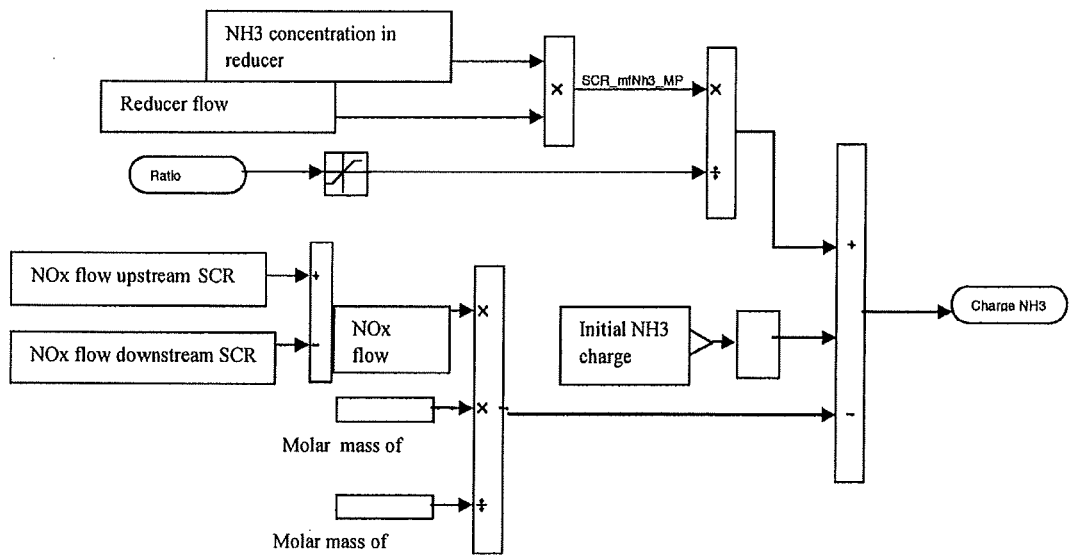
FIG. 7 is a block diagram of a calculation module for the ammonia charge in the catalyst.

FIG. 7 illustrates in more precise manner how this model can be implemented in a control module.

The $NH_3$ mass modeled in the SCR catalyst can also be reinitialized to a new value during a driving phase by the adaptive strategy or by calibration.

Besides this quantity of ammonia stored in the SCR catalyst, there is also at any given time a certain quantity of ammonia available for the NOx reduction reaction. If the ratio $R_{NO2/NO}$ is smaller than 0.5, it is estimated according to the invention that one mole of nitrogen oxides (NO or NO2) reacts with one mole of ammonia. If this ratio is greater than 0.5, more than one mole of nitrogen oxide reacts with one mole of ammonia, and a stoichiometric ratio noted $R_{NO2/NO}$ can be defined as follows:

If $R_{NO2/NO}$<0.5 then $R_{NH3/NOx}$=1

If not $R_{NH3/NO}$=(1+8($R_{NO2/NO}$−0.50))/(1+6*($R_{NO2/NO}$−0.50))

C—Conversion Potential of the SCR Catalyst

The reduction capacity of the SCR catalyst can only be expressed if the SCR catalyst is effectively at a temperature higher than its priming temperature (e.g., for a zeolite type SCR catalyst), a condition which is not satisfied in the first moments following the start of the engine.

Finally, this capacity depends on the temperature of the SCR catalyst and on the $NO_2/NO$ ratio at the inlet of the SCR catalyst.

Starting from an estimate of the $NO_2/NO$ ratio and the temperature of the SCR catalyst, a maximum conversion potential can be defined, assuming that the injection instruction complies with the ammonia storage instruction on the one hand, and the $R_{NH3/NOx}$ ratio on the other hand.

This maximum conversion potential reflects the actual instantaneous conditions, therefore the gap between the conversion potential and the observed efficiency reflects a dysfunction of the SCR system, a dysfunction that can be taken into account practically in real time because it corresponds with instantaneous conditions which may not be momentarily favorable to proper conversion.

Figure 5:
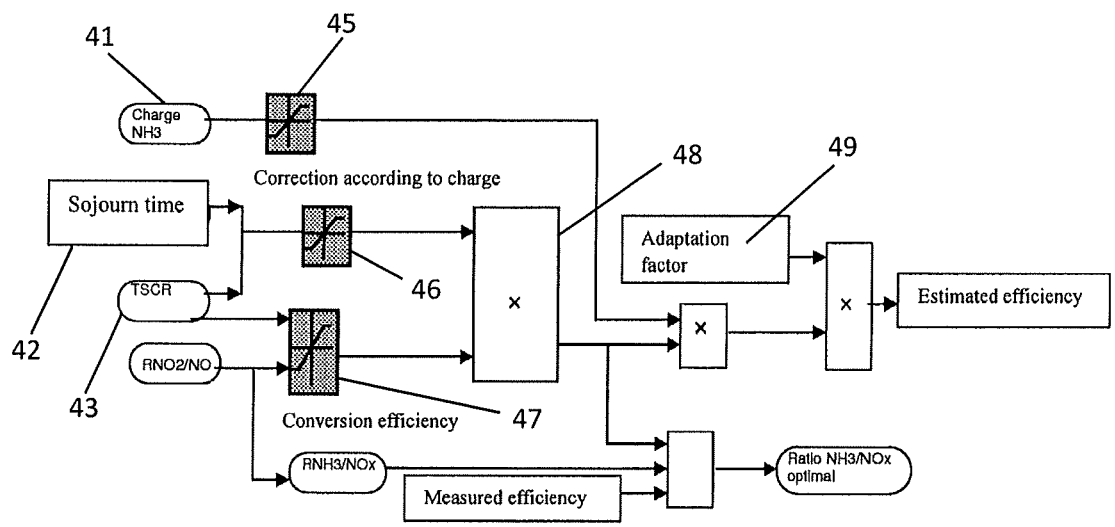
FIG. 5 is a block diagram of the calculation module for the efficiency of the SCR system.

FIG. 5 illustrates a possible use of this model. The input information consists of 4 elements: the initial ammonia charge 41, the sojourn time 42 of the exhaust gas in the SCR catalyst, the temperature of the SCR catalyst 43 and the $R_{NO2/NO}$ ratio.

The temperature of the SCR catalyst is not homogenous, neither in longitudinal nor transversal direction. On the other hand, the SCR catalyst has a certain thermal inertia and its temperature cannot be confounded with the temperature of the exhaust gas. As far as this model is concerned, it is only important that this temperature is estimated in a given point of the SCR catalyst.

Figure 6:
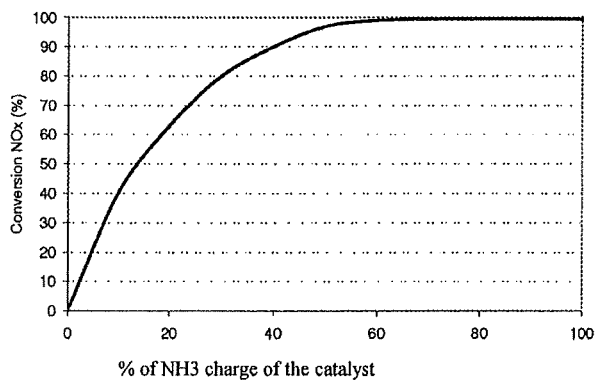
FIG. 6 is a graph illustrating the variation of the efficiency of a SCR catalyst in function of its ammonia charge.

FIG. 6 shows the variation of the efficiency of a SCR catalyst in function of its ammonia charge. Therefore, the charge 41 (shown in FIG. 5) can be converted by means of a map or a transfer function 45 (shown in FIG. 5) into an estimated conversion potential.

This value must be corrected a first time to take into account the time that the gas sojourns in the SCR catalyst and the temperature of the latter, to reflect the fact that the kinetics of the reduction reaction is greater with a hotter catalyst and that the reaction requires a certain time lapse, so that if the sojourn time is shortened (higher exhaust gas flow due to higher engine speed) then the efficiency will be less at isothermal temperature. This correction is performed based on a factor between 0 and 1 obtained in 46.

As previously indicated, the NOx conversion efficiency depends also on the $NO_2/NO$ ratio, and another multiplication factor between 0 and 1 is therefore determined in 47, also starting from an appropriate map.

The combination in 48 (shown in FIG. 5) of factors 46, 47 allows for the modulation of the conversion potential 45.

If necessary, as illustrated in FIG. 5, an adaptation factor 49 is also taken into account which reflects the fact that it is sometimes advantageous to select an injection quantity of ammonia smaller than the quantity which should give the best results, in order to ensure a minimum time interval between two fillings of the reducer reservoir.

The module allows also for estimating the conversion potential of the SCR catalyst and comparing it with the observed nominal efficiency, and for decision making, e.g., the immobilization of the vehicle or the engine going into degraded mode, if it is determined that the SCR system does not operate in nominal manner and requires maintenance to limit pollution risk.

This module can also be used to correct the ammonia charge instruction as proposed in patent application FR2931201, according to which, when an anomaly of the SCR system is detected, whereby the measured efficiency is not conforming to the expectations according to the model and the quantity of reducing agent to be injected is modified, and if the employment of this method leads to a number of successive modifications of the same nature greater than a predetermined value N, the mathematical model is corrected, and the initial mathematical model is replaced by the corrected model.

The invention claimed is:

1. A method for controlling a system for the treatment of exhaust gas present in the exhaust line of an internal combustion engine of a vehicle, said method comprising:
   receiving, from a temperature sensor, at an electronic control module disposed within the vehicle a signal indicative of a temperature of an exhaust gas at an outlet of a DOC oxidation catalyst of the exhaust line, the DOC oxidation catalyst installed in the exhaust line upstream of a NOx reducing agent injector of the exhaust line, the NOx reducing agent injector structured and operable to reduce nitrogen oxide in the exhaust line;
   receiving at the electronic control module a signal indicative of a pressure of the exhaust gas at the outlet of the DOC oxidation catalyst;
   receiving at the electronic control module a signal indicative of a flow rate of the exhaust gas upstream of the DOC oxidation catalyst;
   utilizing the electronic control module to map a sojourn time of the exhaust gas in the DOC oxidation catalyst, based on the exhaust gas temperature, pressure and flow rate;
   utilizing the electronic control module to estimate a molar ratio between nitrogen dioxide and nitrogen monoxide at an inlet of a selective reduction catalyst of the exhaust line utilizing the mapped sojourn time;
   utilizing the electronic control module to adjust the estimated molar ratio based on an aging state of the DOC oxidation catalyst; and
   adjusting, via the electronic control module, the quantity of reducing agent injected by the NOx reducing agent injector into the exhaust, based on the adjusted estimated molar ratio.

2. The method according to claim 1, wherein the selective reduction catalyst is located downstream the injector.

3. The method according to claim 1, wherein the aging state of the DOC oxidation catalyst is calculated by:
   utilizing the electronic control module to calculate an accumulated time of exposure of the DOC oxidation catalyst above a first critical temperature that will cause degradation of the DOC oxidation catalyst; and
   utilizing the electronic control module to calculate a ratio between the accumulated time of exposure of the DOC oxidation catalyst above the first critical temperature that will cause degradation of the DOC oxidation catalyst and an exposure time to the first critical temperature for which the degradation of the DOC oxidation catalyst will be complete.

4. The method according to claim 3, wherein calculating the accumulated time of exposure of the DOC oxidation catalyst above a first critical temperature comprises utilizing the electronic control module to multiply the accumulated time of exposure of the DOC oxidation catalyst above the first critical temperature by a correction factor greater than 1 when the DOC oxidation catalyst is exposed to a second critical temperature that is higher than the first critical temperature.

* * * * *